A. SEGMAN.
JEWELRY.
APPLICATION FILED JUNE 23, 1913.

1,219,172. Patented Mar. 13, 1917.

United STATES PATENT OFFICE.

ALEXANDER SEGMAN, OF NEW YORK, N. Y.

JEWELRY.

1,219,172.

Specification of Letters Patent.

Patented Mar. 13, 1917.

Application filed June 23, 1913. Serial No. 775,399.

*To all whom it may concern:*

Be it known that I, ALEXANDER SEGMAN, a subject of the Czar of Russia, residing in the borough of Manhattan, city, county, and State of New York, have invented an Improvement in Jewelry, of which the following is a specification.

My present invention relates to jewelry, and particularly to a finger ring. The ring made in accordance with my present invention is an improvement upon those forms of finger rings shown and described in Letters Patent No. 1,075,673 granted to me Oct. 14, 1913, for an improvement in jewelry, and the object thereof is the provision of a finger ring provided with a plate or member adjustable to a desired position to vary the effective size or opening of the ring, the adjustment of the said plate or member being effected by a revoluble setting so constructed and connected thereto that in turning the setting, the adjustable plate or member is moved to a desired position while the setting itself does not change its position relatively to that of the ring, its only movement being a revoluble one.

Figure 2:
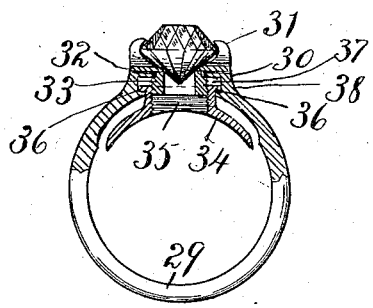
Figure 1:
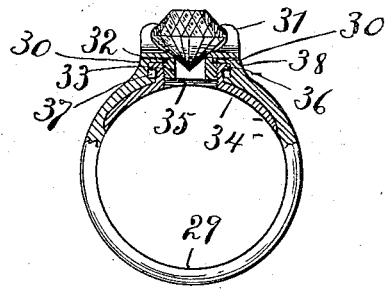

In the drawing, Figure 1 is an enlarged sectional plan of a finger ring illustrating my present invention and showing the parts in the relationship in which the maximum effective opening or size of the ring is obtained, and Fig. 2 is a similar view showing the parts in that position in which the minimum effective opening or size of the ring is obtained.

Referring to the drawing, the ring is indicated at 29 and is provided with a head having an internal peripheral flange 30. 32 designates the base of a setting 31 and to this base is connected an exteriorly screw threaded shank 33, the peripheral portion of the flange or an equivalent member on the head 38 of the ring extending into a recess in the screw threaded shank adjacent to the base 32 of the setting so that this base rests against the outer surface of the flange and turns thereon. 34 represents an adjustable member which is provided with an interiorly screw threaded socket 35 adapted to receive the screw threaded shank 33.

It will now be readily understood that by turning the setting 31, the socket 35 and hence the adjustable member 34 may be moved in and out to the desired position by the engagement of the screw threaded shank in the socket, and in order to prevent the adjustable member 34 from being turned off the screw threaded shank, I prefer to employ pins 36 on opposite sides of the socket 35, the ends of which extend into recesses 37 provided therefor in the interior wall of the head 38 of the ring. These pins 36 may also be secured in opposite sides of the interior wall of the head 38 and their ends made to extend into recesses provided therefor in the outer wall of the socket 35 or adjustable member 34. After the member 34 has been placed in its innermost position, the ends of these pins will abut against the bases of these recesses and prevent the further inward movement of the adjustable member, and furthermore these pins 36 are employed for guiding and maintaining the adjustable member in the plane of the ring while being adjusted to the desired position.

I claim as my invention:

1. An article of jewelry comprising a ring having a head with an aperture therein, a setting, a shank passing through said aperture and connected to said setting, the adjacent parts of said shank and setting being swiveled on a flange in said head, an adjustable member movable on said shank by turning the setting to determine the effective opening of the ring, and means for guiding and maintaining said adjustable member in the plane of the ring during the adjustment thereof.

2. An article of jewelry comprising a ring having an open head in one portion thereof, a flange extending inwardly from said head, a setting, a screw threaded shank connected to the setting, the setting and shank being swiveled to turn on the said flange, an adjustable member, means for connecting the adjustable member to said shank, and means for guiding and maintaining the adjustable member in the plane of the ring during the adjustment thereof and also for limiting the extent of the inward movement of the same.

3. An article of jewelry comprising a ring having an open head in one portion thereof, a flange extending inwardly from said head, a setting, a screw threaded shank connected to said setting, the setting and shank being swiveled to turn on said flange on said head, an adjustable member, a socket connected thereto and adapted to receive the screw threaded shank, and means for guiding and maintaining the adjustable member in the plane of the ring during the adjustment thereof and also for limiting the extent of the inward movement of the same.

4. An article of jewelry comprising a ring having an open head in one portion thereof, a flange extending inwardly from said head, a setting, a screw threaded shank connected to said setting, the setting and shank being swiveled to turn on said flange on said head, an adjustable member normally adapted to lie in a recess in the ring, a socket connected to said adjustable member and adapted to receive the screw threaded shank, and pins secured in and projecting from said socket and extending into recesses provided therefor in the head of the ring in order to maintain said adjustable member in the plane of the ring during the adjustment thereof, and also to limit the extent of the inward movement thereof.

In testimony whereof, I have signed my name to this specification, in the presence of two subscribing witnesses, this 7th day of June, 1913.

ALEXANDER SEGMAN.

Witnesses:
IDA S. COHEN,
HARRY CANTER.

Copies of this patent may be obtained for five cents each, by addressing the "Commissioner of Patents, Washington, D. C."